United States Patent
Inoue et al.

(10) Patent No.: US 8,908,204 B2
(45) Date of Patent: Dec. 9, 2014

(54) METHOD FOR TRANSFERRING PACKAGE OF FILES AND RECORDING MEDIUM STORING THE METHOD

(75) Inventors: Hiroki Inoue, Nagoya (JP); Tetsuya Nose, Nagoya (JP); Mina Kawai, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 164 days.

(21) Appl. No.: 13/025,222

(22) Filed: Feb. 11, 2011

(65) Prior Publication Data

US 2011/0242585 A1 Oct. 6, 2011

(30) Foreign Application Priority Data

Mar. 30, 2010 (JP) ................. 2010-079682

(51) Int. Cl.
*G06F 3/12* (2006.01)

(52) U.S. Cl.
CPC ............ *G06F 3/1285* (2013.01); *G06F 3/1204* (2013.01); *G06F 3/1262* (2013.01)
USPC .......................................... 358/1.15; 358/1.1

(58) Field of Classification Search
None
See application file for complete search history.

(56) References Cited

U.S. PATENT DOCUMENTS

| | | | |
|---|---|---|---|
| 5,715,381 A * | 2/1998 | Hamilton ..................... 358/1.15 |
| 7,536,480 B2 * | 5/2009 | Goosen et al. ............... 709/247 |
| 7,773,248 B2 | 8/2010 | Kadota | |
| 8,171,056 B2 * | 5/2012 | Yoshioka ..................... 707/802 |
| 2003/0227641 A1 * | 12/2003 | Edmonds et al. ............ 358/1.13 |
| 2005/0108436 A1 * | 5/2005 | Goossen et al. ............. 709/246 |
| 2008/0007781 A1 | 1/2008 | Oike et al. | |
| 2008/0222181 A1 * | 9/2008 | Yoshioka ..................... 707/101 |

FOREIGN PATENT DOCUMENTS

| | | | |
|---|---|---|---|
| EP | 1324187 | 7/2003 | |
| EP | 1324187 A1 * | 7/2003 | .............. G06F 3/12 |
| JP | 2002209051 | 7/2002 | |
| JP | 2005167547 | 6/2005 | |
| JP | 2005190407 | 7/2005 | |
| JP | 2008015846 | 1/2008 | |

OTHER PUBLICATIONS

Extended European Search Report issued in European Application No. 11154698.2 on Apr. 16, 2013.

* cited by examiner

*Primary Examiner* — Marcus T Riley
(74) *Attorney, Agent, or Firm* — McCarter & English, LLP

(57) ABSTRACT

A method for transferring a package of files that is executed by a personal computer, the package of files being made up of plural compressed files that are separately present therein. For transferring the package of files, the personal computer creates, with respect to each printer, a dedicated file that is exclusively acceptable to similar-dedicated-file-compatible models of the printer; the personal computer treats the respective dedicated files as the plural files and creates the package of files by packaging the respective dedicated files in the package of files; and with respect to the respective dedicated files in the package of files, in transferring the package of files, when it is detected by the personal computer, that the personal computer is connected to the printer that is compatible with the dedicated file, the personal computer transfers the dedicated file in the package of files to the detected printer.

7 Claims, 6 Drawing Sheets

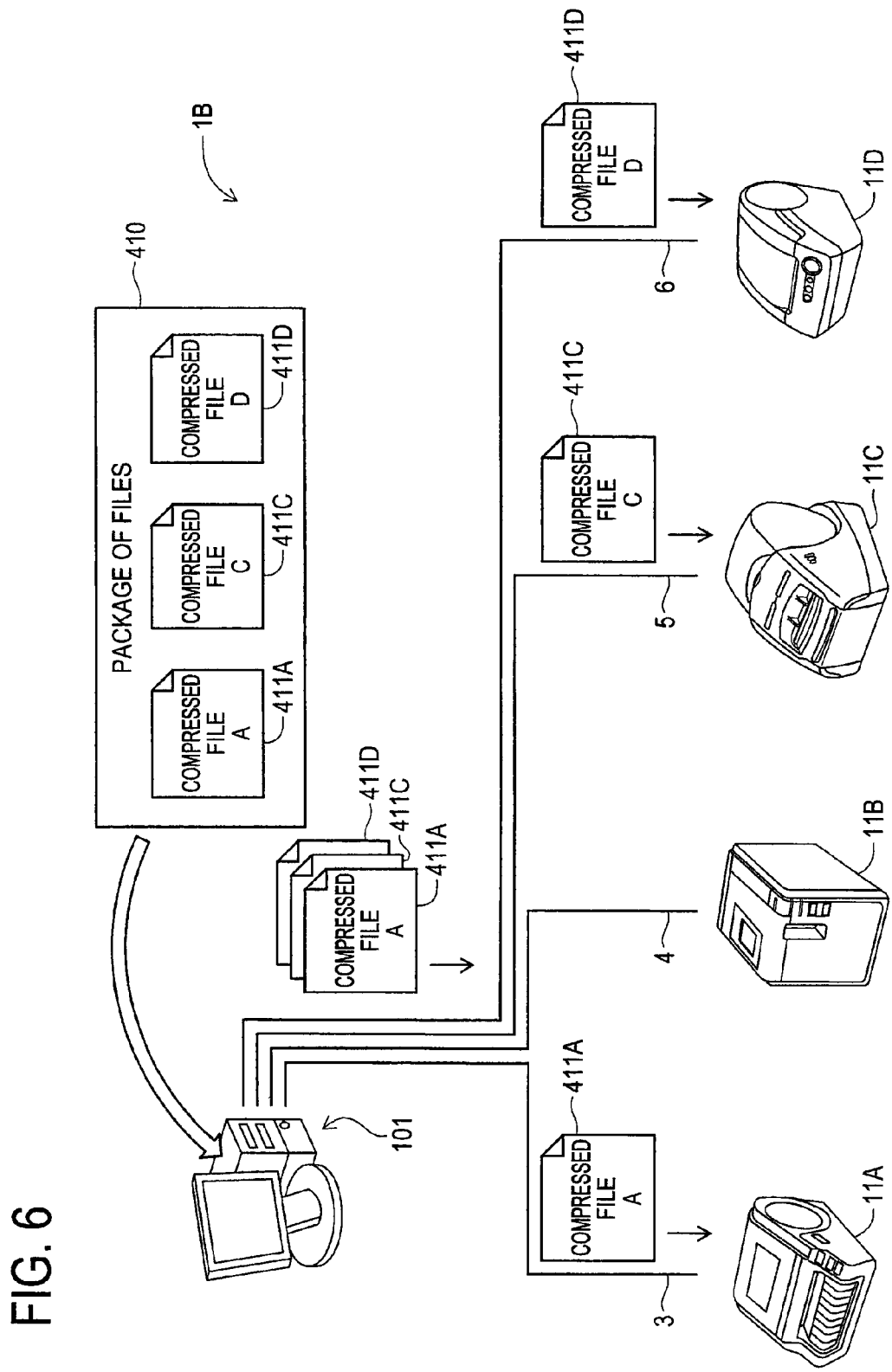

METHOD FOR TRANSFERRING PACKAGE OF FILES AND RECORDING MEDIUM STORING THE METHOD

CROSS REFERENCE TO RELATED APPLICATIONS

The present application claims priority from Japanese Patent Application No. JP 2010-079682, which was filed on Mar. 30, 2010, the disclosure of which is incorporated herein by reference in its entirety.

TECHNICAL FIELD

The disclosure relates to a method for transferring a package of files wherein dedicated files that are exclusively compatible with similar model printers are simultaneously transferred to their respective compatible printers, and a recording medium that stores the method for transferring a package of files.

BACKGROUND

There has conventionally been used an application software that allows a user to choose a printing apparatus to which a file is transmitted. The conventional application software also allows a user to choose plural files to be transmitted to a single printing apparatus of his/her choice. Thereby, the user can transmit plural files of his/her choices to the single printing apparatus of his/her choice with a single transmission instruction.

The conventional application software, however, allows a user to choose only a single printing apparatus as transmission destination of file(s). Accordingly, when plural printing apparatuses are available as transmission destination of the file(s), it has been required for the user to again choose one of the plural printing apparatuses as new transmission destination of the file(s) and to make a single transmission instruction thereby.

Every time the user wishes to transmit dedicated file(s) compatible with an exclusive model printing apparatus, it has been required for him/her to make a transmission instruction by canceling designation of the last chosen printing apparatus and newly choosing the exclusive model printing apparatus as new transmission destination of the dedicated file(s); alternatively, it has been required for the user to make a transmission instruction by choosing another type of dedicated file(s) compatible with the exclusive model printing apparatus he/she has previously chosen.

SUMMARY

The disclosure has been made to solve the above-described problem. Also, the object of the disclosure is to provide a method for transferring a package of files wherein dedicated files that are exclusively compatible with similar model printers are simultaneously transferred to their respective compatible printers, and a recording medium that stores the method for transferring a package of files.

To achieve the purpose of the disclosure, there is provided a method for transferring a package of files that is executed by a personal computer, the package of files being made up of plural compressed files that are separately present therein, wherein, for transferring the package of files from the personal computer to one or more of printers connected to the personal computer, [1] the personal computer creates, with respect to each printer, a dedicated file that is exclusively acceptable to similar-dedicated-file-compatible models of the printer; [2] the personal computer treats the respective dedicated files as the plural files and creates the package of files by packaging the respective dedicated files in the package of files; and [3] with respect to the respective dedicated files in the package of files, in transferring the package of files, when it is detected, by the personal computer, that the personal computer is connected to the printer that is compatible with the dedicated file, the personal computer transfers the dedicated file in the package of files to the detected printer.

To achieve the purpose of the disclosure, there is provided a recording medium that stores an application software for making a personal computer execute a method for transferring a package of files, the package of files being made up of plural compressed files that are separately present therein, wherein, for transferring the package of files from the personal computer to one or more of printers connected to the personal computer, [1] the personal computer creates, with respect to each printer, a dedicated file that is exclusively acceptable to similar-dedicated-file-compatible models of the printer; [2] the personal computer treats the respective dedicated files as the plural files and creates the package of files by packaging the respective dedicated files in the package of files; and [3] with respect to the respective dedicated files in the package of files, in transferring the package of files, when it is detected; by the personal computer, that the personal computer is connected to the printer that is compatible with the dedicated file, the personal computer transfers the dedicated file in the package of files to the detected printer.

BRIEF DESCRIPTION OF THE DRAWINGS

FIG. 6 is a schematic diagram illustrating a method for transferring a package of files directed to another embodiment.

DETAILED DESCRIPTION

A detailed description of an exemplary embodiment of a method for transferring a package of files directed to an embodiment of the disclosure will now be given by referring to drawings. First, there will be described the outline of the method for transferring a package of files directed to the present embodiment of the disclosure by referring to FIG. 1 through FIG. 3.

Figure 1:
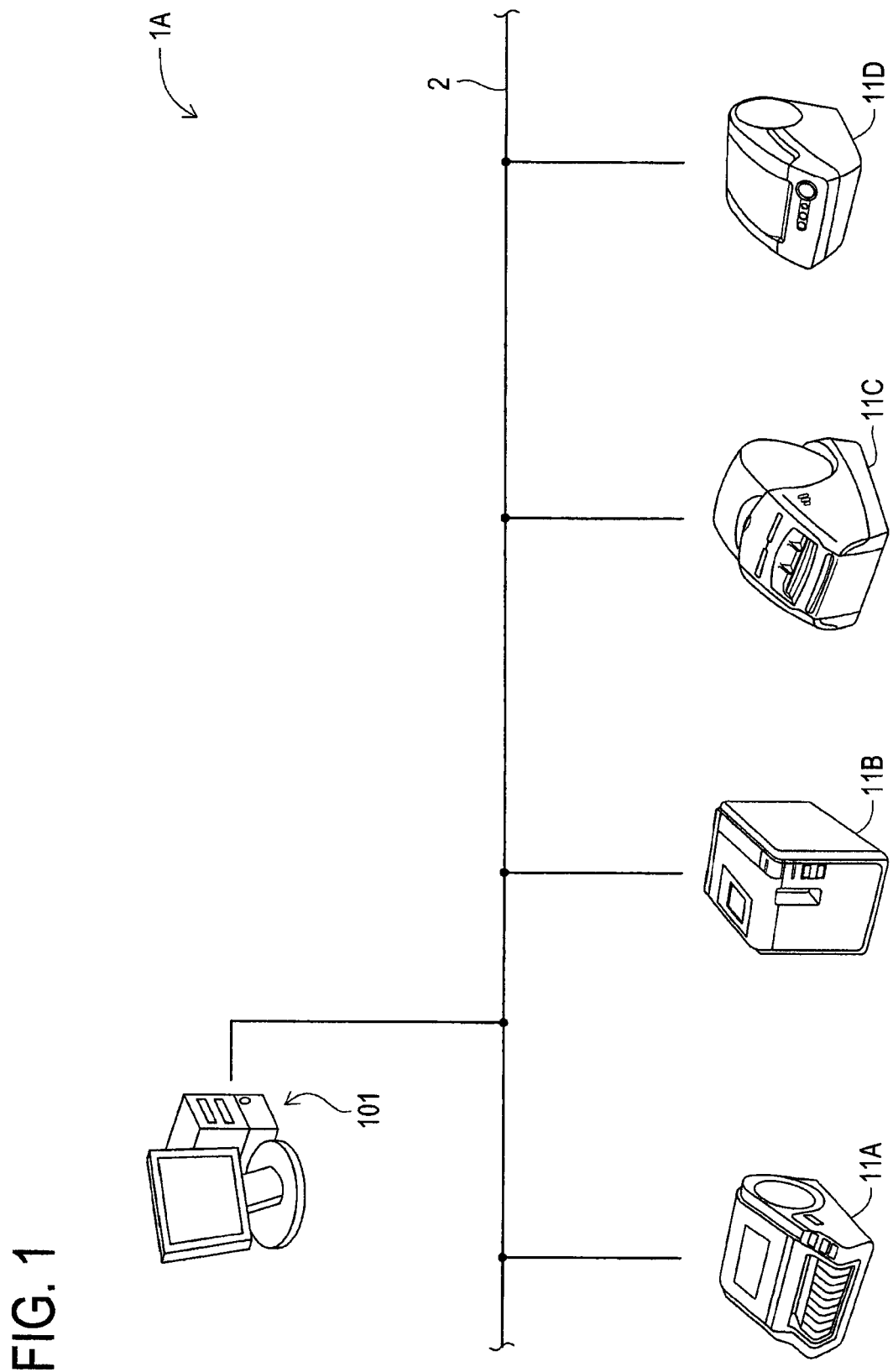
FIG. 1 is a schematic diagram of a network that realizes a method for transferring a package of files directed to an embodiment of the disclosure.

In a network 1A shown in FIG. 1, a first printer 11A, a second printer 11B, a third printer 11C, a fourth printer 11D, etc. are connected to a personal computer 101 through a network system 2.

Here, each of the first printer 11A, the second printer 11B, the third printer 11C and the fourth printer 11D is a different-model "label printer" and may use a dedicated file exclusive to each of them.

Figure 2:
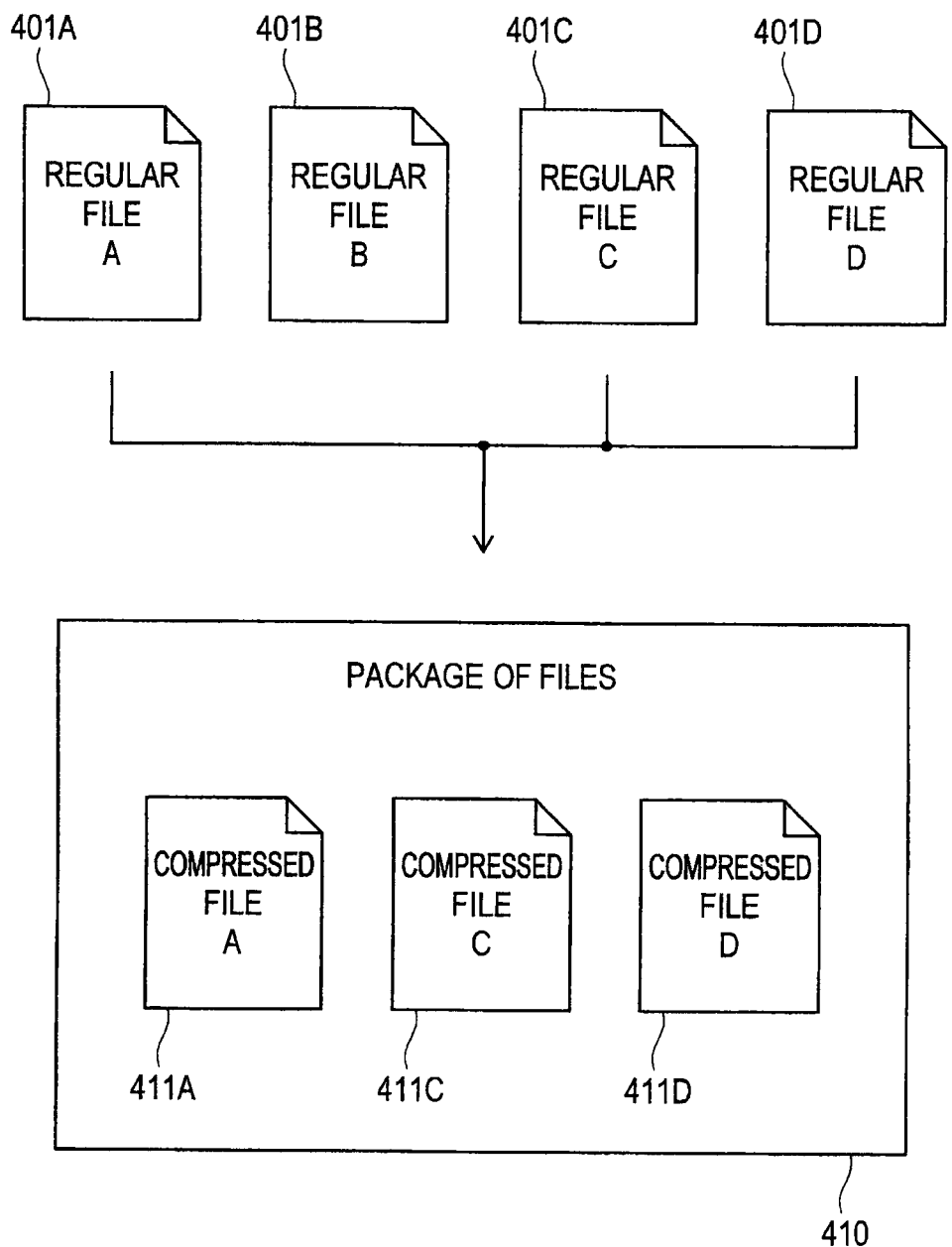
FIG. 2 is a conceptual diagram showing an example of file format dealt in the method for transferring a package of files.

In an example of the method for transferring a package of files shown in FIG. 2, a regular file A (dedicated file) 401A, a regular file B (dedicated file) 401B, a regular file C (dedicated file) 401C, a regular file D (dedicated file) 401D, etc. are dealt.

The regular file A (dedicated file) 401A is a dedicated file exclusively compatible with both the first printer 11A and the same model printers thereof. The regular file B (dedicated file) 401B is a dedicated file exclusively compatible with both the second printer 11B and the same model printers thereof. The regular file C (dedicated file) 401C is a dedicated file exclusively compatible with both the third printer 11C and the same model printers thereof. The regular file D (dedicated file) 401D is a dedicated file exclusively compatible with both the fourth printer 11D and the same model printers thereof. Here, all the regular files (dedicated files) 401A, 401B, 401C and 401D are stored in the personal computer 101 (refer to FIG. 1).

In the example of the method for transferring a package of files directed the present embodiment shown in FIG. 2, a "package of files" 410 is made of the regular file A (dedicated file) 401A, the regular file C (dedicated file) 401C and the regular file D (dedicated file) 401D. In the "package of files" 410, a compressed file A (dedicated file) 411A, a compressed file C (dedicated file) 411C and a compressed file D (dedicated file) 411D are separately present.

The compressed file A (dedicated file) 411A is a file created by compressing the regular file A (dedicated file) 401A and exclusively compatible with both the first printer 11A and the same model printers thereof. The compressed file C (dedicated file) 411C is a file created by compressing the regular file C (dedicated file) 401C and exclusively compatible with both the third printer 11C and the same model printers thereof. The compressed file D (dedicated file) 411D is a file created by compressing the regular file D (dedicated file) 401D and exclusively compatible with both the fourth printer 11D and the same model printers thereof.

Figure 3:
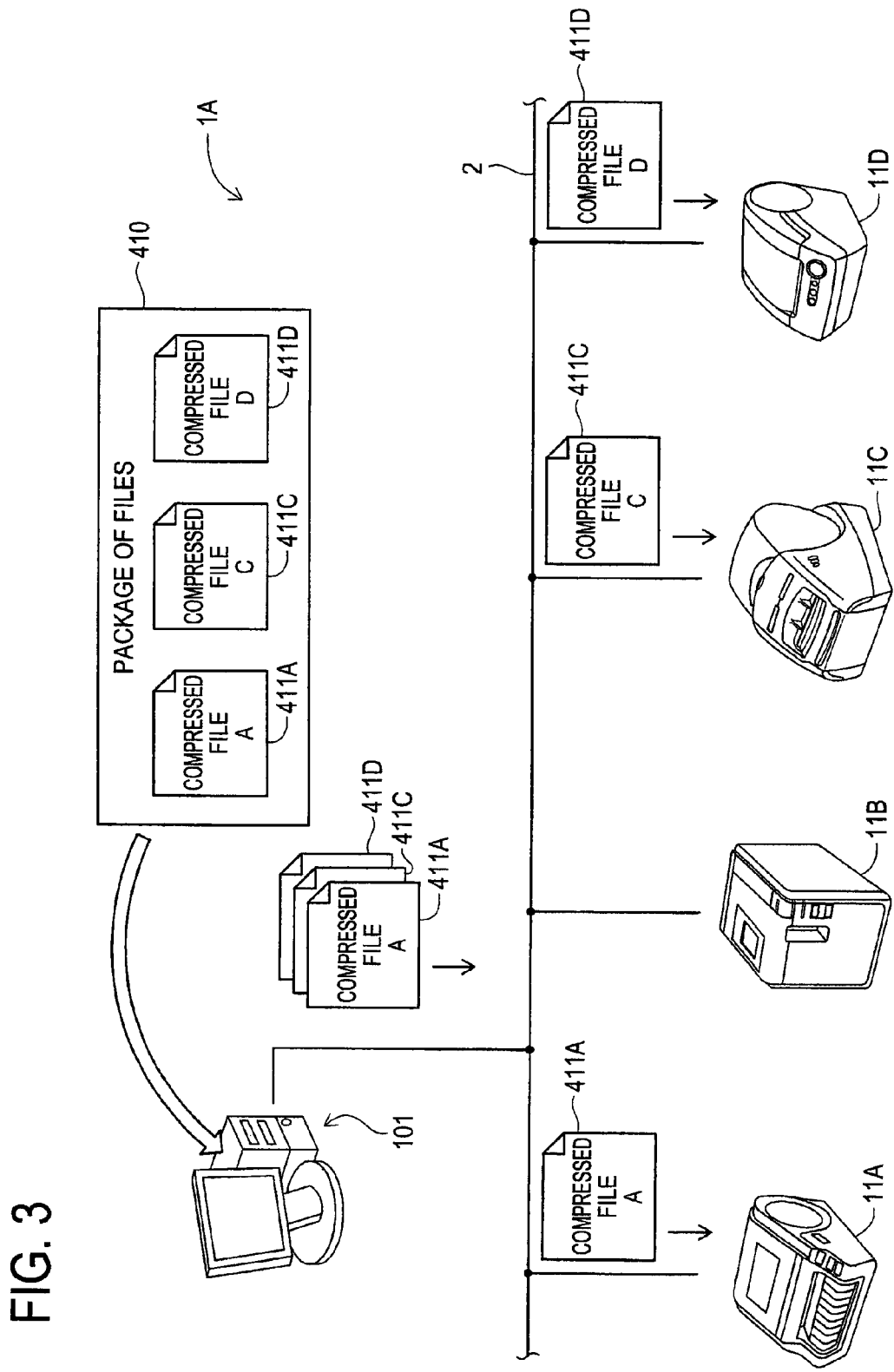
FIG. 3 is a schematic diagram illustrating the method for transferring a package of files.

According an example of the method for transferring a package of files directed the present embodiment shown in FIG. 3, the "package of files" 410 is created by a user with the personal computer 101. Thereafter, when the user carries out an operation to transfer the "package of files" 410 with the personal computer 101, the respective compressed files (dedicated files) 411A, 411C and 411D in the "package of files" 410 are simultaneously transmitted to their respective compatible printers 11A, 11C and 11D through the network system 2.

That is, remaining the compressed state, the compressed file A (dedicated file) 411A is transferred to the first printer 11A that is compatible with the compressed file A (dedicated file) 411A. Remaining the compressed state, the compressed file C (dedicated file) 411C is transferred to the third printer 11C that is compatible with the compressed file C (dedicated file) 411C. Remaining the compressed state, the compressed file D (dedicated file) 411D is transferred to the fourth printer 11D that is compatible with the compressed file D (dedicated file) 411D.

Figure 4:
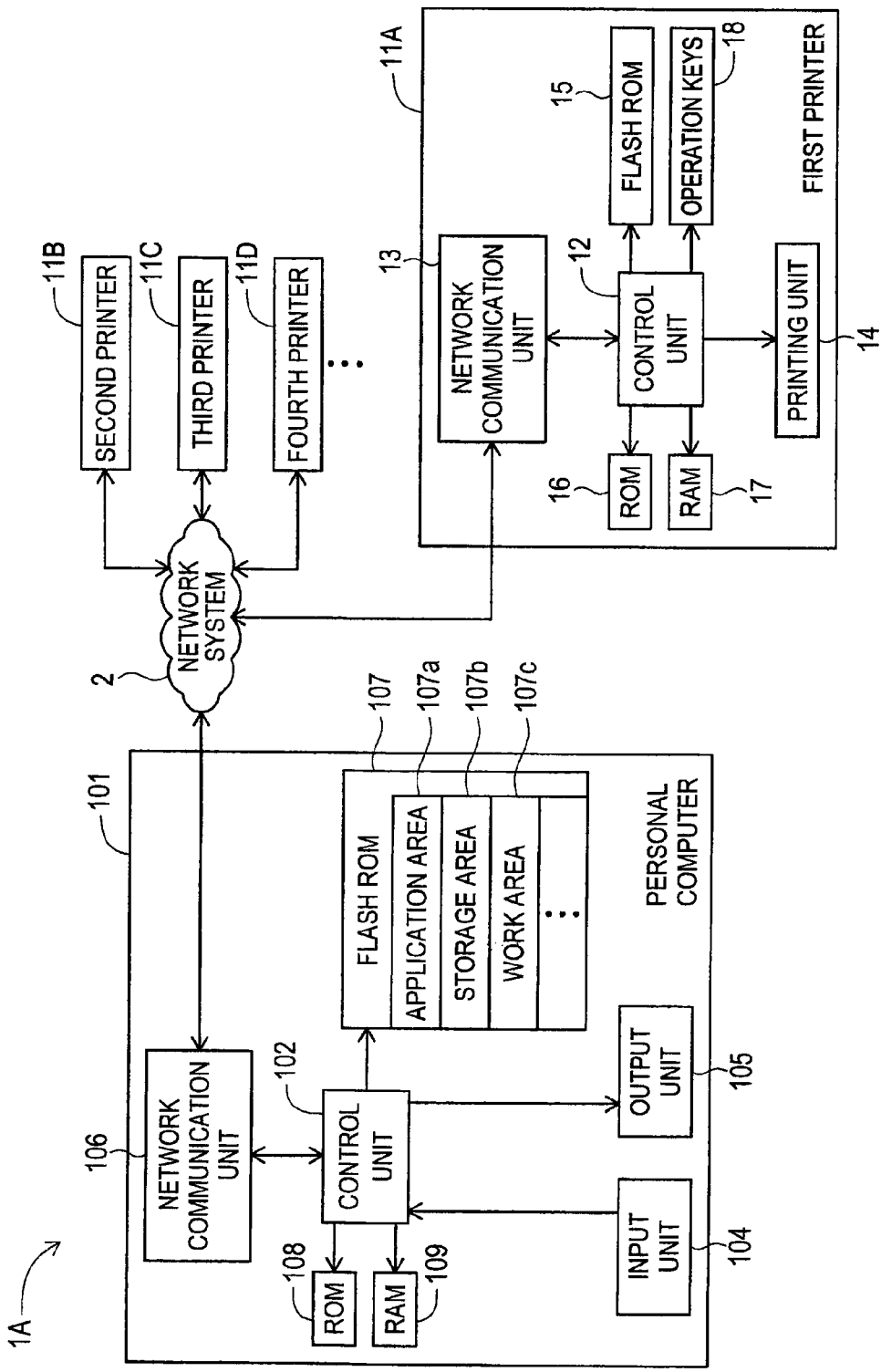
FIG. 4 is a block diagram of the network in which the method for transferring a package of files is realized.

As shown in the block diagram of FIG. 4, the network 1A is made up of the personal computer 101, the network system 2 (e.g., LAN, etc.), the respective printers 11A, 11B, 11C and 11D which are connected to the network system 2, and the like.

The personal computer 101 serves as host for each of the printers 11A, 11B, 11C and 11D and includes a control unit 102, an input unit 104, an output unit 105, a network communication unit 106, a flash ROM 107, a ROM 108, a RAM 109, etc. The control unit 102 is a micro controller that controls the above-mentioned constituent elements of the personal computer 101 and executes various control programs.

The input unit 104 corresponds to various operation buttons arranged on a keyboard, a mouse or the like. The output unit 105 corresponds to a liquid crystal display or the like. The network communication unit 106 is a unit that connects the personal computer 101 to the network system 2. The flash ROM 107 includes an application area 107a where application software is stored, a storage area 107b, a work area 107c, etc. The application software used here is an applicative program that realizes the method for transferring a package of files directed to the present embodiment and may be stored in the ROM 108 alternatively. The storage area 107b is an area where the "package of files" 410 (refer to FIG. 2 and FIG. 3) is stored. The work area 107c is a work area used when executing the applicative program that realizes the method for transferring a package of files. Such a work area, however, may be arranged only in the RAM 109. The ROM 108 stores the various control programs. The RAM 109 serves a work area when the control unit 102 executes the various control programs.

The first printer 11A is a "label printer" of which host is the personal computer 101 and includes a control unit 12, a network communication unit 13, a printing unit 14, a flash ROM 15, a ROM 16, a RAM 17, operation keys 18 and etc. The control unit 12 is a micro controller that controls the above-mentioned constituent elements of the first printer 11A and executes various control programs. The network communication unit 13 is a unit that connects the first printer 11A to the network system 2. The printing unit 14 carries out printing on a label printing medium based on a printer command (print instruction, print data or the like). The flash ROM 15 stores contents to be printed on a label printing medium, a transferred file and the like. The transferred file, in the example of FIG. 3, corresponds to the compressed file A (dedicated file) 411A. The ROM 16 stores the various control programs. The RAM 17 serves a work area when the control unit 12 executes the various control programs. As the operation keys 18, depression buttons or the like are used.

Since the second printer 11B, the third printer 11C and the fourth printer 11D are configured similarly in comparison with the first printer 11A, illustrations of their respective constituent elements and descriptions will be omitted. As already mentioned, the first printer 11A, the second printer 11B, the third printer 11C and the fourth printer 11D are totally different models to one another and they may require use of dedicated files exclusively compatible with their respective models.

Figure 5:
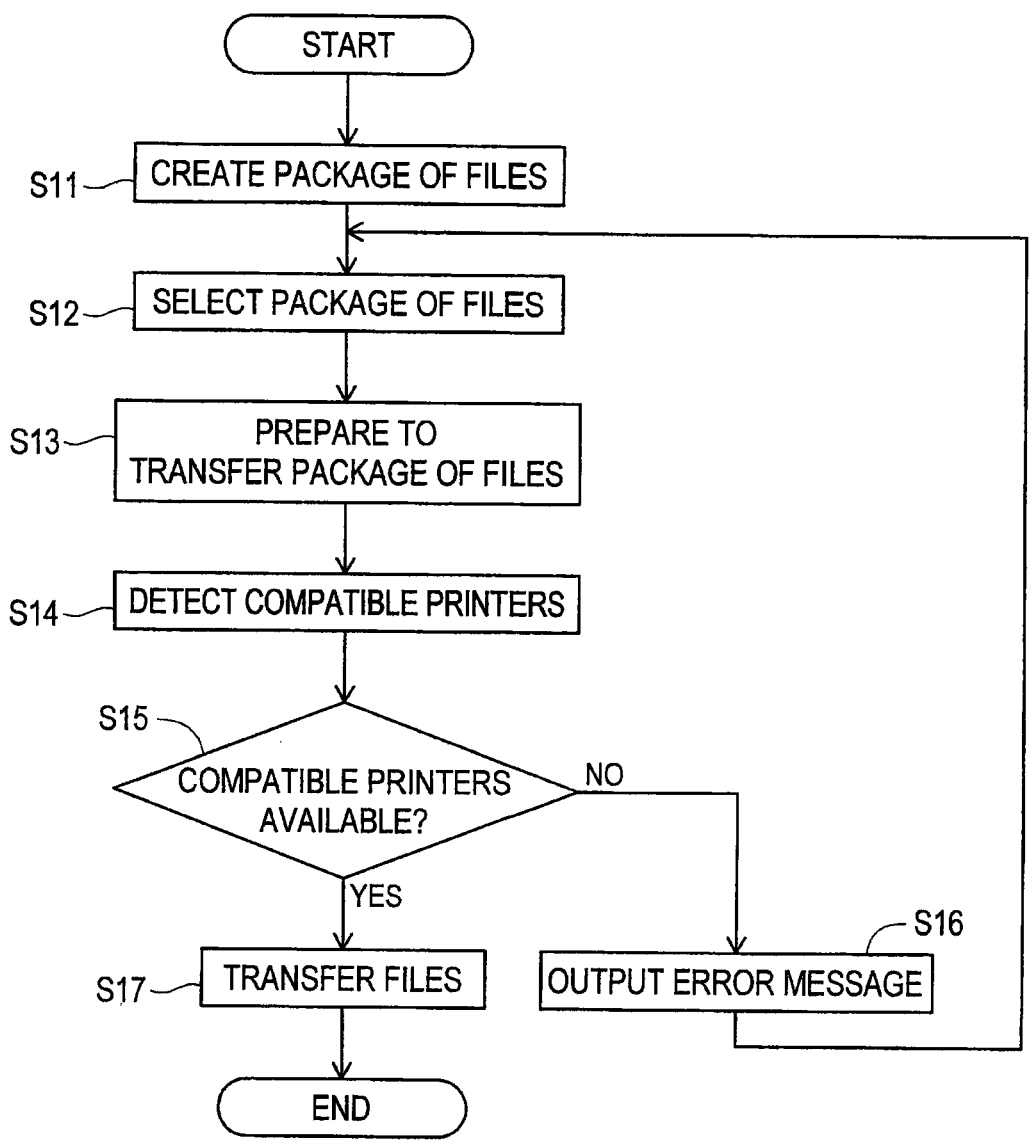
FIG. 5 is a flowchart of a program that realizes the method for transferring a package of files.

The program of the flowchart of FIG. 5 shows the main routine program of the application software stored in the application area 107a in the flash ROM 107 of the personal computer 101. The program as indicated in a form of the flowchart in FIG. 5 is executed with the personal computer 101. According to FIG. 5, the method for transferring a package of files directed to the present embodiment gets started with creation of a package of files at S11.

At the process of S11, the control unit 102 creates a package of files by allowing a user to operate the input unit 104 and stores the thus created package of files in the storage area 107b of the flash ROM 107. Thereby, one or more of package(s) of files is/are stored in the storage area 107b of the flash ROM 107. In the example directed to FIG. 2 and FIG. 3, the control unit 102 creates the "package of files" 410 by making of the regular file A (dedicated file) 401A, the regular file C (dedicated file) 401C and the regular file D (dedicated file) 401D and stores the thus created "package of files" 410 in the storage area 107b of the flash ROM 107. At this moment, the control unit 102 creates the "package of files" 410 in a state that the compressed file A (dedicated file) 411A, the compressed file C (dedicated file) 411C and the compressed file D (dedicated file) 411D are present separately. After that, the control unit 102 shifts the process to S12.

At the process S12, a package of files is selected. More specifically, the control unit 102 selects one from one or more of package(s) of files stored in the storage area 107b of the flash ROM 107 by allowing the user to operate the input unit 104. After that, the control unit 102 shifts the process to S13.

At the process S13, preparation for transferring a package of files is carried out. More specifically, in the example of FIG. 2 and FIG. 3, given that the "package of files" 410 is selected at S12, the control unit 102 stores the "package of files" 410 in the work area 107c of the flash ROM 107 in a state that each of the compressed files (dedicated files) 411A, 411C, 411D is separately present in the "package of files" 410. After that, the control unit 102 shifts the process to S14.

At the process S14, compatible printers are detected. More specifically, the control unit 102 detects printers that are compatible with respective compressed files (dedicated files) in the package of files selected at S12, from among printers connected to the personal computer 101. In the example of FIG. 2 and FIG. 3, the control unit 102 detects the printers 11A, 11C and 11D as being respectively compatible with the compressed file A (dedicated file) 411A, the compressed file C (dedicated file) 411C and the compressed file D (dedicated file) 411D included in the "package of files" 410 selected at S12, from among printers connected to the personal computer 101. After that, the control unit 102 shifts the process to S15.

At the process S15, the control unit 102 determines whether or not printers compatible with respective compressed files (dedicated files) included in the package of files selected at S12 are available among printers connected to the personal computer 101. The determination at S15 is made based on the detection result obtained at S14. When printers compatible with respective compressed files (dedicated files) included in the package of files selected at S12 are not available (S15: NO), the control unit 102 shifts the process to S16.

At the process S16, an error message is outputted. More specifically, the control unit 102 makes the liquid crystal display, i.e., the output unit 105, indicate an error message. Also, at S16, the control unit 102 deletes all the compressed files (dedicated files) that are stored in the work area 107c of the flash ROM 107 during the process to prepare for transferring a package of files at S13. After that, the control unit 102 repeats processes following S12.

On the other hand, when a printer compatible with one of compressed files (dedicated files) in the package of files selected at S12 is available among printers connected to the personal computer 101 (S15: YES), the control unit 102 shifts the process to S17.

At the process S17, one or more of file(s) in the package of files is/are transferred. More specifically, the control unit 102 transfers the compressed files (dedicated files) stored in the work area 107c of the flash ROM 107 during the process to prepare for transferring a package of files at S13 to their respective compatible printers. In the example of FIG. 2 and FIG. 3, from the work area 107c of the flash ROM 107, the control unit 102 transfers the compressed file A (dedicated file) 411A, included in the "package of files" 410 selected at S12, to its compatible printer 11A in a compressed state. Also, from the work area 107c of the flash ROM 107, the control unit 102 transfers the compressed file C (dedicated file) 411C and the compressed file D (dedicated file) 411D, included in the "package of files" 410 selected at S12, to their respective compatible printers 11C and 11D in a compressed state. After that, the control unit 102 terminates the program.

That is, according to the method for transferring a package of files directed to the present embodiment, in the example of FIG. 2, it is allowed to create the dedicated files (the respective regular files 401A, 401B, 401C, 401D and the respective compressed files 411A, 411B, 411C, 411D). Those dedicated files are created so as to be exclusively compatible with both the printers 11A, 11B, 11C, 11D and their respective similar models. In accordance with the user's operation with the input unit 104, the personal computer 101 creates the "package of files" 410 as plural files, from each of the dedicated files (the respective compressed files 411A, 411B, 411C, 411D) (S11).

With respect to the respective dedicated files (the respective compressed files 411A, 411C, 411D in the example of FIG. 2 and FIG. 3) in "package of files" 410, in transferring the "package of files" 410 (S13 and the following processes), when it is detected, by the personal computer 101, that the personal computer 101 is connected to the printer (the first printer 11A, the third printer 11C and the fourth printer 11D in the example of FIG. 3) that is compatible with the dedicated file (S14 and S15: YES), the personal computer 101 transfers the respective dedicated file (the respective compressed files 411A, 411C, 411D in the example of FIG. 2 and FIG. 3) in the "package of files" 410 to the detected printer (the first printer 11A, the third printer 11C and the fourth printer 11D in the example of FIG. 3) (S17). In this connection, the "package of files" 410 can be created regardless of models of the printers 11A, 11B, 11C, 11D . . . (S11). Therefore, the dedicated files (the respective regular files 401A, 401B, 401C, 401D and the respective compressed files 411A, 411B, 411C, 411D) that are exclusively compatible with similar model printers can be simultaneously transferred to their respective compatible printers 11A, 11B, 11C, 11D . . . (S14).

Also, according to the method for transferring a package of files directed to the present embodiment, in the example of FIG. 2 and FIG. 3, the personal computer 101 compresses the respective dedicated files (regular files 411A, 411C, 411D) in an independent state as the plural files and packages the respective compressed dedicated files so as to create the "package of files" 410 (S11). Remaining the compressed state, the dedicated files (respective compressed files 411A, 411C, 411D) in the "package of files" 410 are transferred to their respective detected printers (the first printer 11A, the third printer 11C and the fourth printer 11D) (S17). In this connection, the dedicated file (each compressed files 411A, 411C, 411D) is transferred in the compressed state. Therefore, amount of data of the thus transferred dedicated file (each compressed files 411A, 411C and 411D) can be made small.

According to the method for transferring a package of files directed to the present embodiment, though different from the example of FIG. 2 and FIG. 3, in transferring the "package of files" 410 (S13 and the following processes), with respect to the respective dedicated files (respective compressed files 411A, 411C, 411D) in the "package of files" 410, when it is detected, by the personal computer 101, that the personal computer 101 is not connected to the printer (the first printer 11A, the third printer 11C or the fourth printer 11D) that is compatible with the dedicated file (S14 and S15: NO), the personal computer 101 outputs the transfer failure of the dedicated file (error message) to the liquid crystal display, namely, the output unit 105 (S16). Thereby, the user can be informed of the transfer failure of the dedicated file (each compressed file 411A, 411C, 411D).

While presently exemplary embodiments of the present disclosure have been shown and described, it is to be understood that this disclosure is for the purpose of illustration and that various changes and modifications may be made without departing from the scope of the disclosure as set forth in the appended claims.

For instance, with respect to the method for transferring a package of files directed to the present embodiment, in the example of FIG. 2 and FIG. 3, the regular files 401A, 401C, 401D, i.e., which are not-compressed files, may be used as dedicated files to make up the "package of files" 410 instead of the compressed files 411A, 411C, 411D.

As shown in FIG. 1 and FIG. 3, in the network 1A in which the method for transferring a package of files directed to the present embodiment is realized, the first printer 11A, the second printer 11B, the third printer 11C, the fourth printer 11D, etc. are connected to the personal computer 101 through the network system 2. In this connection, like a network 1B as shown in FIG. 6, the first printer 11A, the second printer 11B, the third printer 11C, the fourth printer 11D, etc. may be directly connected to the personal computer 101 by cables 3, 4, 5, and 6 (e.g., USB cables). In FIG. 6, the same reference signs are assigned to portions identical with those indicated in FIG. 3 and descriptions on those identical portions are omitted, accordingly.

Further, with respect to the method for transferring a package of files directed to the present embodiment, in transferring a package of files (S13 through S17), the personal computer 101 may be configured to detect remaining memory capacity of a printer to which one of dedicated files in the package of files is transferred. When insufficient memory capacity is detected, the dedicated file to be transferred to the printer with the insufficient memory capacity may be excluded from the package of files so that transfer of the dedicated file to the printer should be canceled.

What is claimed is:

1. A method for transferring a packaged file from a personal computer to a plurality of printers connected to the personal computer, the personal computer comprising a control unit and a computer storage device,
    wherein the computer storage device stores a first dedicated file and a second dedicated file,
    wherein the first dedicated file is a dedicated file which is available for only a first printer model,
    wherein the second dedicated file is a dedicated file which is available for only a second printer model,
    wherein the second printer model differs from the first printer model,
    wherein the control unit creates a packaged file by packaging the first dedicated file and the second dedicated file in a condition that a first compressed file and a second compressed file are present separately, the first compressed file being a compressed file compressed the first dedicated file, the second compressed file being a compressed file compressed the second dedicated file,
    wherein
    [1] the control unit detects a first model of a first printer connected to the personal computer;
    [2] the control unit compares the detected first model to the first printer model; and
    [3] the control unit transfers the first compressed file of the packaged file to only the first printer when the detected first model corresponds to the first printer model, wherein
    [4] the control unit detects a second model of a second printer connected to the personal computer;
    [5] the control unit compares the detected second model to the second printer model; and
    [6] the control unit transfers the second compressed file of the packaged file to only the second printer when the detected second model corresponds to the second printer model.

2. The method for transferring a packaged file according to claim 1,
    wherein, when the control unit receives an instruction as to a selection of the first dedicated file and the second dedicated file, the control unit creates the packaged file by packaging the first dedicated file and the second dedicated file in a condition that the first compressed file and the second compressed file are present separately, the first compressed file being a compressed file compressed the first dedicated file, the second compressed file being a compressed file compressed the second dedicated file.

3. The method for transferring a packaged file according to claim 1,
    wherein the control unit stores the packaged file in the computer storage device when the control unit receives an instruction as to a selection of the packaged file.

4. The method for transferring a packaged file according to claim 1,
    wherein the personal computer comprising a display, and
    wherein, when both the first printer model and the second printer model differ from both the detected first model and the detected second model, the control unit makes the display indicate an error message that the first compressed file and the second compressed file are not transferred.

5. The method for transferring a packaged file according to claim 1,
    wherein the first printer comprising a first printer storage device, and
    wherein, for transferring the first compressed file which is included in the packaged file stored in the computer storage device to only the first printer,
    [A] the control unit detects a remaining memory capacity of the first printer storage device; and
    [B] the control unit cancels transferring the first compressed file to only the first printer
    when the detected remaining memory capacity is insufficient memory capacity.

6. The method for transferring a packaged file according to claim 1,
    wherein
    [7] the control unit compares the detected second model to the first printer model, and
    [8] the control unit transfers the first compressed file of the packaged file to the second printer when the detected second model corresponds to the first printer model.

7. A non-transitory computer-readable recording medium that stores an application software for making a personal computer execute a method for transferring a packaged file, the packaged file transferred from the personal computer to a plurality of printers connected to the personal computer,
    wherein the personal computer comprising a control unit and a computer storage device,
    wherein the computer storage device stores a first dedicated file and a second dedicated file,
    wherein the first dedicated file is a dedicated file which is available for only a first printer model,
    wherein the second dedicated file is a dedicated file which is available for only a second printer model,
    wherein the second printer model differs from the first printer model, wherein the control unit creates a packaged file by packaging the first dedicated file and the second dedicated file in a condition that a first compressed file and a second compressed file are present separately, the first compressed file being a compressed file compressed the first dedicated file, the second compressed file being a compressed file compressed file second dedicated file, wherein

[1] the control unit detects a first model of a first printer connected to the personal computer;

[2] the control unit compares the detected first model to the first printer model; and

[3] the control unit transfers the first compressed file of the packaged file to only the first printer when the detected first model corresponds to the first printer model, wherein

[4] the control unit detects a second model of a second printer connected to the personal computer;

[5] the control unit compares the detected second model to the second printer model; and

[6] the control unit transfers the second compressed file of the packaged file to only the second printer when the detected second model corresponds to the second printer model.

* * * * *